US006334296B2

(12) United States Patent
Futa, Jr. et al.

(10) Patent No.: US 6,334,296 B2
(45) Date of Patent: Jan. 1, 2002

(54) FUEL DIVIDER AND ECOLOGY SYSTEM FOR A GAS TURBINE ENGINE

(75) Inventors: Paul W. Futa, Jr., North Liberty; Steven F. Fisher, South Bend, both of IN (US); Kevin R. Sharp, Libertyville, IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/875,328

(22) Filed: Jun. 6, 2001

Related U.S. Application Data

(62) Division of application No. 09/361,932, filed on Jul. 27, 1999.

(51) Int. Cl.[7] .............................. F02C 7/232; F02C 7/26
(52) U.S. Cl. ................ 60/39.06; 60/39.094; 60/39.141; 60/739
(58) Field of Search .................... 60/39.06, 39.094, 60/39.141, 734, 739

(56) References Cited

U.S. PATENT DOCUMENTS

| | | | |
|---|---|---|---|
| 2,508,260 A | 5/1950 | Holley ........................... 60/44 |
| 2,543,366 A | 2/1951 | Haworth et al. ............... 60/41 |
| 2,814,931 A | 12/1957 | Johnson ....................... 60/35.6 |
| 2,846,845 A | 8/1958 | Parker ........................ 60/39.09 |
| 2,881,827 A | 4/1959 | Roche et al. .................. 158/36 |
| 3,033,277 A | 5/1962 | Cowles et al. .............. 158/36.4 |
| 3,103,229 A | 9/1963 | Smith .......................... 137/107 |
| 3,195,611 A | 7/1965 | Tyler ......................... 158/36.3 |
| 3,344,602 A | 10/1967 | Davies et al. .............. 60/39.28 |
| 3,556,444 A | 1/1971 | Kopp ......................... 244/135 |
| 3,557,764 A | 1/1971 | Pinner et al. ............... 123/139 |
| 3,575,533 A | 4/1971 | Bubula .................... 417/182.5 |
| 3,774,394 A | 11/1973 | Criffield .................... 60/39.09 |
| 3,808,796 A | 5/1974 | Spears ....................... 60/39.09 |
| 3,841,089 A | 10/1974 | Clark ......................... 60/39.09 |
| 3,901,025 A | 8/1975 | Bryerton et al. ........... 60/39.09 |

(List continued on next page.)

FOREIGN PATENT DOCUMENTS

| | | | | |
|---|---|---|---|---|
| EP | 518 594 A1 | 12/1992 | .......... G05D/16/10 |
| EP | 761 946 A | 3/1997 | ........... F02C/7/232 |
| GB | 1077291 | 7/1967 | |
| GB | 1 294 820 | 11/1972 | ........... F02C/22/26 |

*Primary Examiner*—Louis J. Casaregola
(74) *Attorney, Agent, or Firm*—Larry J. Palguta

(57) ABSTRACT

A fuel control system for supplying metered quantities of fuel from a fuel supply (11), through a fuel pump (13), a metering valve (15) and a pressurizing valve (17) to a plurality of engine fuel manifolds (31a, 31b, 33) includes an ecology valve (43) for withdrawing fuel from the engine fuel manifolds (31a, 31b, 33) during cessation of engine operation and for returning fuel to the engine fuel manifolds (31a, 31b, 33) to be burned during normal engine operation. The ecology valve (43) includes a valve housing (44) having a plurality of ecology ports (50, 52, 54) adapted to be coupled to corresponding ones of the engine fuel manifolds (31a, 31b, 33) and a control port (46) adapted to be connected to a corresponding control port (45) of the fuel pressurizing valve (17). A movable piston (63) is supported within the valve housing (44) for reciprocable motion and divides the interior of the valve housing (44) into a variable volume control chamber (71) coupled to the control port (46) and a variable volume fuel reservoir (55) which is selectively coupled to and uncoupled from the ecology ports (50, 52, 54) by the piston (63). Fuel is withdrawn from the manifolds (31a, 31b, 33) seriatim. A fuel flow dividing arrangement is located intermediate the pressurizing valve (17) and the engine fuel manifolds (31a, 31b, 33) for distributing appropriately fuel flow among the manifolds and includes a concatenated pair of two-way splitter valves (39, 41) comprising a first splitter valve (39) distributing the fuel flow between an atomizer nozzle manifold (31b) and the remaining manifolds (31a, 33), and a second splitter valve (41) distributing down stream fuel flow from the first splitter valve (39) between upper and lower manifolds (31, 33).

14 Claims, 8 Drawing Sheets

U.S. PATENT DOCUMENTS

| | | | |
|---|---|---|---|
| 4,041,695 A | 8/1977 | Harper et al. | 60/39.02 |
| 4,066,386 A | 1/1978 | Johnson et al. | 417/199 |
| 4,095,418 A | 6/1978 | Mansson et al. | 60/39.09 |
| 4,118,926 A | 10/1978 | Curvino et al. | 60/39.06 |
| 4,132,201 A | 1/1979 | Bart | 123/139 |
| 4,149,372 A | 4/1979 | Gavin et al. | 60/39.09 |
| 4,206,595 A | 6/1980 | Cole | 60/39.09 |
| 4,215,549 A | 8/1980 | Daeschner | 60/606 |
| 4,309,156 A | 1/1982 | Gonner et al. | 417/403 |
| 4,423,595 A | 1/1984 | McLean | 60/261 |
| 4,671,232 A | 6/1987 | Stumpp et al. | 123/300 |
| 4,719,749 A | 1/1988 | Greune et al. | 60/39.094 |
| 5,010,727 A | 4/1991 | Cox | 60/39.06 |
| 5,159,808 A | 11/1992 | Kast | 60/39.091 |
| 5,284,020 A * | 2/1994 | Brocard et al. | 60/739 |
| 5,339,636 A | 8/1994 | Donnelly et al. | 60/734 |
| 5,442,922 A * | 8/1995 | Dyer et al. | 60/739 |
| 5,465,570 A | 11/1995 | Szillat et al. | 60/39.06 |
| 5,528,897 A | 6/1996 | Halin | 60/39.094 |
| 5,809,771 A | 9/1998 | Wernberg | 60/39.094 |

\* cited by examiner

FUEL DIVIDER AND ECOLOGY SYSTEM FOR A GAS TURBINE ENGINE

This is a division of patent application Ser. No. 09/361,932 filed Jul. 27, 1999.

The present invention relates generally to fuel delivery systems for engines, especially aircraft gas turbine engines, and more particularly to ecology and fuel flow splitting functions for such fuel delivery systems.

Some fuel delivery systems for gas turbine engines require multiple fuel manifolds to segregate various types of fuel nozzles for optimal engine performance. A means of dividing this flow between the manifolds is therefor required. U.S. Pat. No. 5,809,771 Wernberg discloses an ecology valve and a fuel flow splitting valve having a single piston operable in two different regions, one for modulating flow to primary and secondary engine nozzles as a function of fuel pressure and another where flow to primary and secondary engine nozzles is determined by the fixed port geometry. It is very difficult to extend this concept to more than two distinct engine manifolds.

Some engines also require an ecology function that removes a set quantity of fuel from the engine fuel manifold (s) upon cessation of engine operation. Fuel removal is required for two reasons. First, it keeps fuel from vaporizing into the atmosphere. Second, it keeps fuel from coking on the engine's fuel nozzles, a condition that hinders nozzle performance. Prior art ecology systems have used an arrangement of pistons, check valves, plumbing, reservoirs and pumps to accomplish this task. In engines requiring multiple fuel manifolds, multiple ecology valves or a multiple chambered ecology valve have been used. These types of architecture result in complex, high cost and weight ecology systems. A two chambered valve is disclosed in the above-mentioned Wernberg U.S. Pat. No. 5,809,771. In the Wernberg system, fuel is simultaneously withdrawn from the two manifolds and a separate chamber is required for each engine manifold to ensure discrete fuel removal from those manifolds upon engine shut-down. It is also very difficult to extend this concept to more than two distinct engine manifolds. The Wernberg system employs at least one check valve downstream of the ecology valve for diverting a part of the modulated flow from the primary to the secondary manifold. Such downstream valving allows a degree of undesirable cross-talk between the manifold supply lines and may reduce engine fuel flow reliability or increase the load on the fuel supply pump.

It is desirable to minimize the fuel remaining in an engine fuel manifold upon cessation of engine operation and to provide a compact, economical ecology function for fuel supply systems. It is also desirable to achieve such an ecology function by employing a simple single diameter piston valve which is controlled solely by a signal from a pressurizing valve, and to accomplish the ecology function while avoiding any cross-talk between the several manifold fuel supply lines thereby maintaining the fuel pressure integrity in those several lines. It is further desirable to avoid this cross-talk while achieving a fuel splitting function which is operable to appropriately distribute fuel to a plurality of engine fuel manifolds.

The present invention provides solutions to the above problems in the form of a fuel divider and ecology system adapted for an engine requiring three discrete fuel manifolds. One manifold contains atomizer nozzles (for engine start), and two manifolds contain air blast nozzles, one servicing the lower half and the other servicing the upper half of the engine. For the flow dividing function, the system incorporates a plurality of valves to appropriately distribute metered burn flow to these three fuel manifolds. This system accomplishes the ecology function using one single chamber staged valve, and modifying the main fuel control pressurizing valve to include a pressure switching function. This approach limits the ecology components to one ecology valve piston, and one plumbed line from the pressurizing valve to control it. The fuel splitting function is achieved by a first splitter valve which divides the fuel flow from a pressurizing valve between atomizer or start-up nozzles and air blast or main running nozzles; and a second splitter valve which subdivides flow between the upper and lower manifolds.

In accordance with one form the invention, an ecology valve for minimizing the accumulation of fuel in a multiple fuel manifold engine system when the engine is shut down has a control port coupled to and controlled solely by an engine fuel system pressurizing valve and a housing with a piston reciprocable therein between first and second extreme positions. The piston defines, in conjunction with the housing, a variable volume chamber for sequentially withdrawing fuel from each of the engine fuel manifolds when the engine is de-energized and the piston moves from the first extreme position toward the second extreme position thereby purging the manifolds of fuel. There is a spring within the housing which supplies a force to the piston to urge the piston toward the second extreme position and the piston responds to high pressure at the ecology valve control port overpowering the spring to move toward the first extreme position. There are a plurality of sidewall or ecology ports in the housing selectively opened and closed by piston movement to couple the variable volume chamber and selected fuel manifolds.

In accordance with another form of the invention, an improved fuel flow dividing arrangement is located intermediate a pressurizing valve and a plurality of engine fuel manifolds for appropriately distributing fuel flow among the manifolds. The arrangement includes a concatenated pair of two-way splitter valves one of which distributes fuel flow between an atomizer nozzle manifold and the remaining manifolds. Another splitter valve distributes the down stream fuel flow from the first splitter valve between upper and lower air blast nozzle manifolds. The second splitter valve provides a pair of low volume fuel flow paths to the upper and lower manifolds during engine start-up and a second pair of high volume fuel flow paths to the upper and lower manifolds during normal engine running conditions. There is a head effect fuel flow restricting valve in the low volume fuel flow path to the lower manifold to compensate for elevation difference induced low burn rate fuel flow differences between the upper and lower manifolds. The first splitter valve provides a low volume fuel flow path to the second splitter valve during engine start-up and a second high volume fuel flow path to the second splitter valve during normal engine running conditions, and switches fuel routed to the atomizer nozzles from pressurizing valve discharge pressure to the lower manifold pressure.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
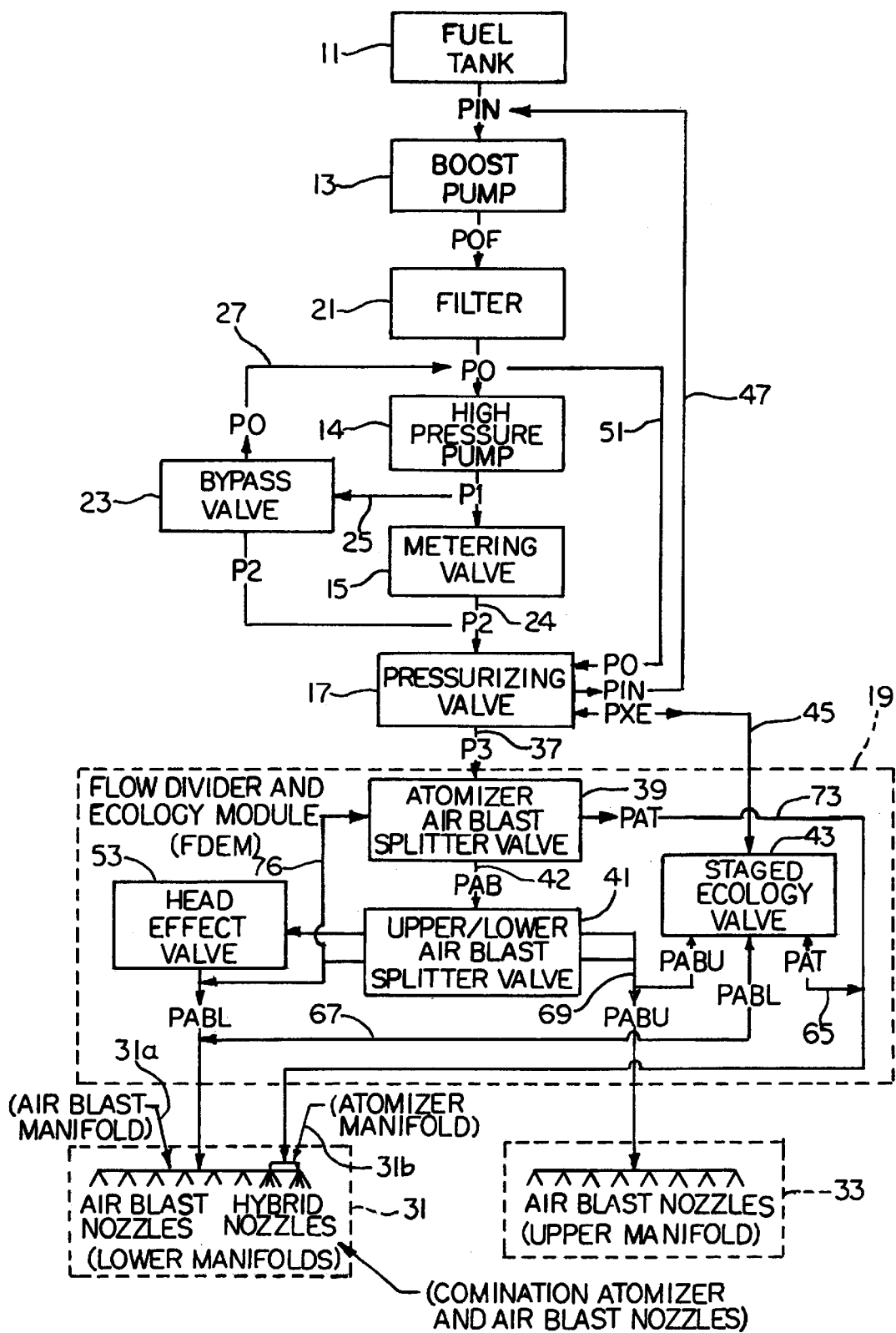
FIG. 1 is a schematic representation of an illustrative aircraft fuel system including an ecology function according to the present invention.

The following abbreviations are used for various pressures throughout the description:
PIN fuel control inlet pressure
POF pump interstage pressure before filter
PO pump interstage pressure after filter
P1 high pressure pump discharge
P2 metering valve discharge pressure
P3 pressurizing valve discharge pressure
PAT burn flow pressure to atomizer nozzles
PAB burn flow pressure to air blast nozzles
PABL burn flow pressure to lower air blast nozzles
PABU burn flow pressure to upper air blast nozzles
PXE ecology valve control pressure FIG. 1 is a block diagram showing a gas turbine engine fuel divider and ecology module, as well as the related upstream and down stream fuel system components. In FIG. 1, an illustrative aircraft fuel supply system includes a supply tank 11 from which fuel is fed to boost pump 13 and a filter 21 to a high pressure pump 14. The high pressure pump 14 discharge pressure P1 is supplied to a variable orifice metering valve 15 and through a pressurizing valve 17 and a flow divider and ecology module 19 to an engine. The pressurizing valve 17 maintains a reference pressure level P2 on the downstream side 24 of the metering valve 15 and the bypass valve 23 selectively diverts fuel from line 25 back through line 27 to the high pressure pump 14 inlet to maintain a constant head or pressure drop across the metering valve 15. Fuel entering the fuel manifolds 31 and 33 of the engine from pressurizing valve 17 flows through line 37, a first flow dividing valve 39 and a second flow dividing valve 41. Fuel entering the atomizer nozzles in fuel manifolds 31 from pressurizing valve 17 flows directly from the first flow divider valve 39 to the engine manifold. The pressurizing valve 17 opens when burn flow pressure is sufficiently greater than return flow pressure, that is, when the pressure differential between P2 on line 24 and P0 on line 51 becomes sufficiently great and closes when that pressure differential drops below a certain threshold. The pressurizing valve 17 includes appropriate lands and grooves to couple selectively the staged ecology valve 43, by means of control line or port 45, to either fuel control inlet pressure on line 47 or to metering valve 15 discharge pressure by way of line 24. The components of the flow divider and ecology module 19 are shown in greater detail in FIGS. 2–7.

In FIGS. 2–7, the ecology valve 43 includes a valve housing 44 including ecology ports 50, 52 and 54 which are coupled to the engine fuel manifolds 31 and 33. The ecology valve also includes a control port 46 connected to a corresponding control port of the fuel pressurizing valve 17. There is a movable piston 63 supported within the valve housing 44 for reciprocable motion along an axis. The piston 63 divides the valve housing into a variable volume control chamber 71 (see FIG. 3) which is coupled to the control port 46 and a variable volume fuel reservoir 55. The piston 133 has one extreme position (FIGS. 5, 6 and 7) in which a sidewall port 64 is open to a first port 54 to couple the fuel reservoir 55 to a first or upper engine fuel manifold 33 while the remaining ports 52 and 50 are closed isolating the reservoir from the lower engine fuel manifold 31 which comprises air blast manifold 31a and atomizer manifold 31b. The piston 63 has a second extreme position (FIG. 2) in which a second port 50 is open to couple the fuel reservoir 55 to the hybrid nozzles of the atomizer manifold 31b of the second or lower engine fuel manifolds 31 while the other ports 52 and 54 are closed isolating the reservoir from air blast manifold 31a of lower manifolds 31 and from the remaining engine fuel upper manifold 33. In a preferred form, there are exactly three ports selectively opened and closed by piston motion with the port 52 opening to couple the fuel reservoir to engine fuel lower manifolds 31 only while the piston is in transition and closing both of the other ports 50 and 54 as in the transition from FIG. 3 to FIG. 4. Thus, the piston 63 has one extreme position (FIGS. 5–7) in which it closes at least one port such as 50 and a second extreme position (FIG. 2) in which it closes at least one other port 54. Fuel is withdrawn sequentially from the manifolds 33, 31a and 31b. There are three manifolds (31a, 31b and 33) and three disjoint time intervals, one for each manifold, during which fuel is withdrawn from or supplied to exactly one manifold. Both withdrawing from and supplying fuel to any one manifold is substantially completed before the withdrawal from or supplying to another manifold commences.

Figure 2:
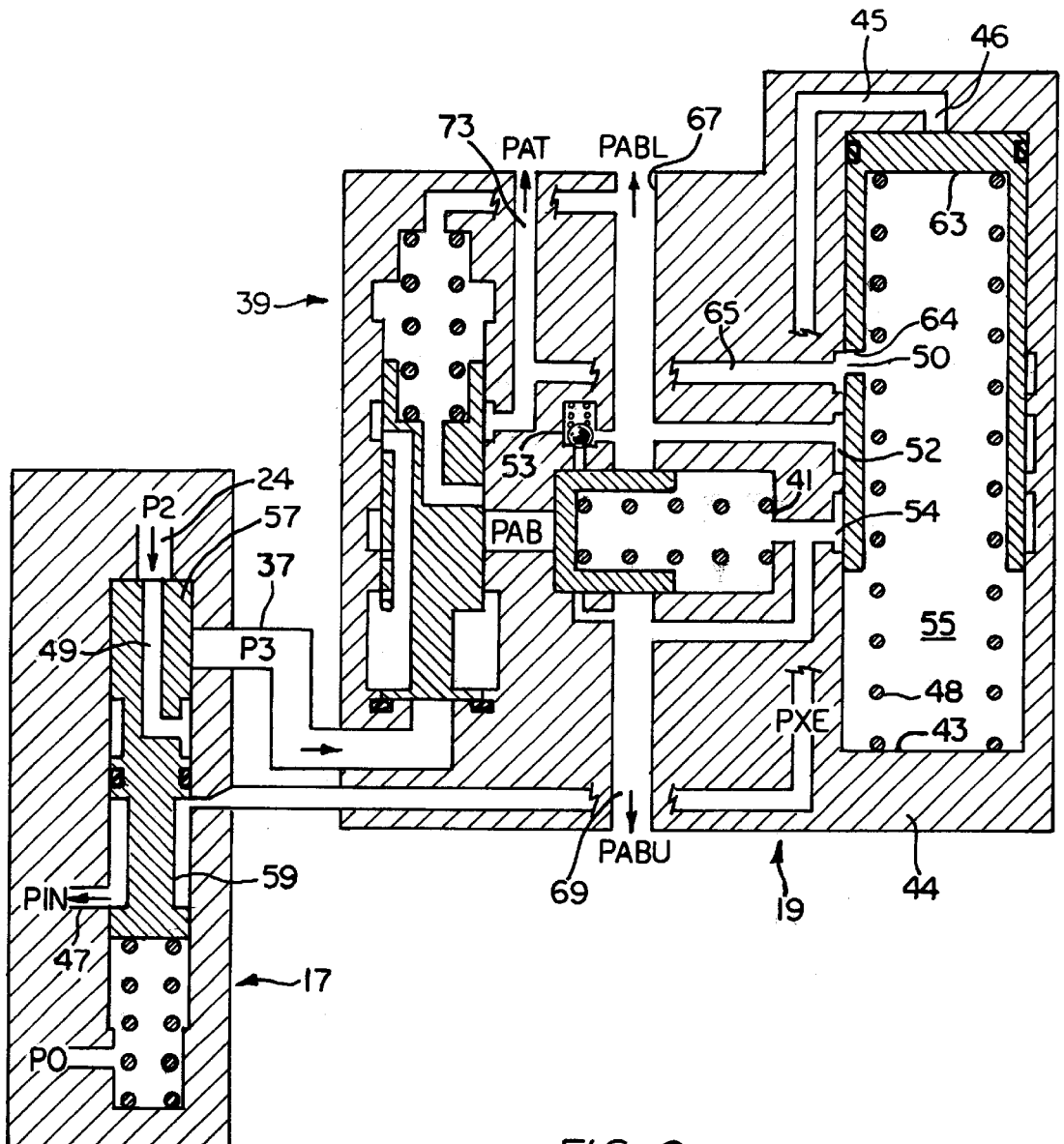
FIG. 2 is a detailed cross-sectional view of the pressurizing valve, and flow divider and ecology module of FIG. 1 in the engine off position.

FIG. 2 shows the pressurizing valve 17 closed, blocking the P2/P3 flow path, with its switching function connecting PXE pressure on line 45 (FIG. 1) to PIN pressure on line 47 by way of the groove 59 in piston 57. As illustrated in FIG. 2, this low pressure PIN at the ecology valve control port 46 exerts a force on the piston 63 which is less than the force exerted by spring 48 to urge the piston 63 toward its uppermost position as illustrated, a condition indicative of a quiescent engine condition. The ecology valve 43 is thereby shown filled with fuel and the engine manifolds are purged. Set amounts of fuel have been retracted from the manifolds into the spring cavity 55 of the valve. The flow divider valves 39 and 41, and head effect valve 53 are also in their closed positions. These are the engine off positions of all valves.

Figure 3:
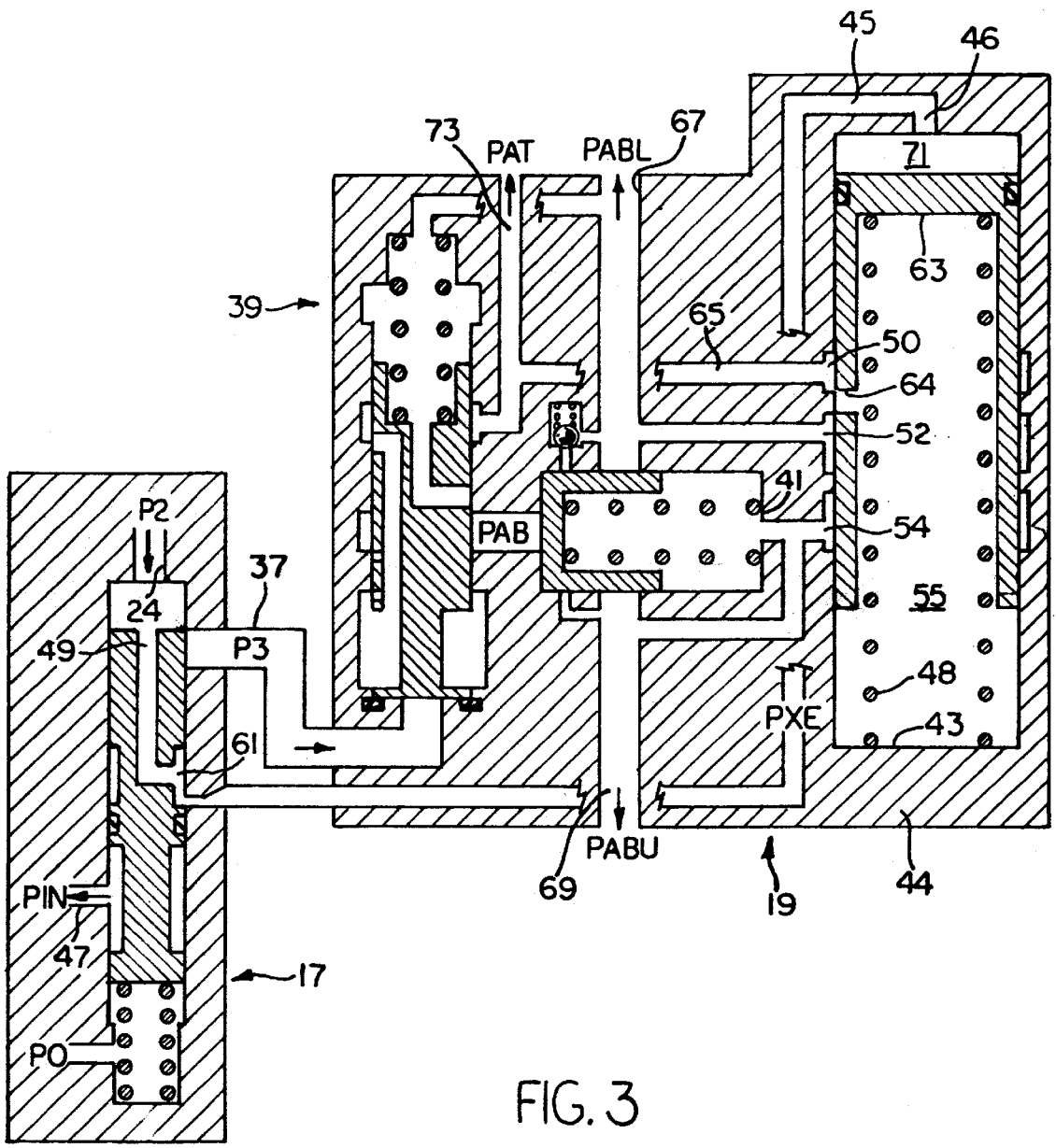
FIG. 3 is a cross-sectional view similar to FIG. 2, and illustrating the pressurizing valve beginning to open prior to engine start-up and commencement of fuel discharge from the ecology valve.

FIG. 3 shows the piston 57 of pressurizing valve 17 at the P2/P3 near open or cracking position, with its switching function connecting PXE pressure in line 45 to P2 pressure in passage 49 via groove 61. At this position with the P2/P3 flow path blocked, fuel control pressurization is up, and manifold pressure (as well as the spring side of the ecology valve) is down. The piston 63 of ecology valve 43 is shown traveling toward its energized position, staging the return of stored fuel from chamber 55 on the spring side of the valve to the manifolds. At this ecology valve stage, fuel has been returned from chamber 55 to the atomizer manifold 31b (PAT pressure) by way of line 65. This process is occurring during engine spool up (prior to start).

Figure 4:
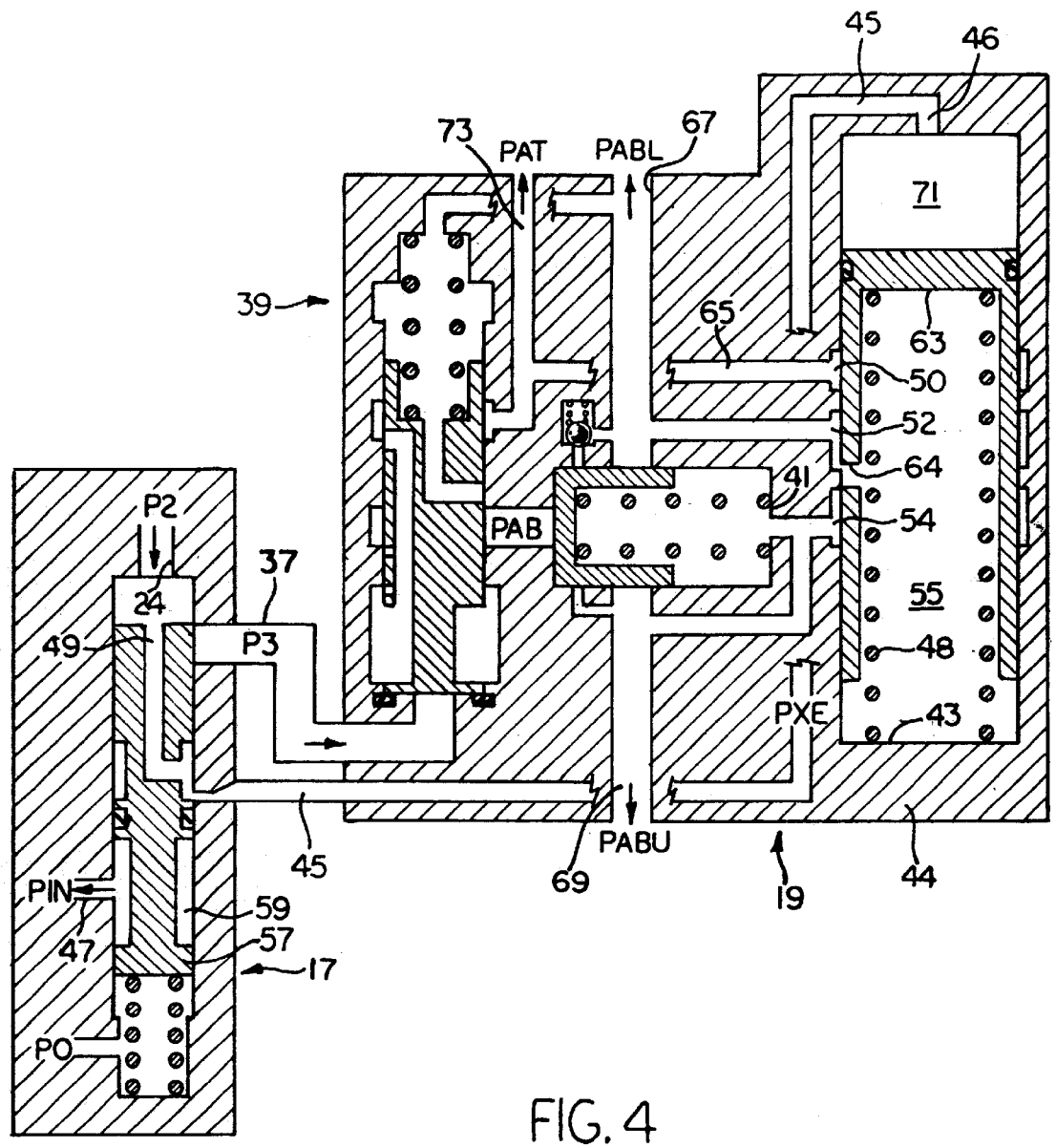
FIG. 4 is a cross-sectional view similar to FIGS. 2 and 3, and illustrating a second stage of fuel discharge from the ecology valve.

FIG. 4 shows the second stage position of the ecology valve 43, where fuel has been returned by way of conduit 67 to the lower air blast fuel manifolds 31 (PABL pressure). The pressurizing valve 17 and flow divider valves 39 and 41 remain in the same functional positions as described in FIG. 3.

Figure 5:
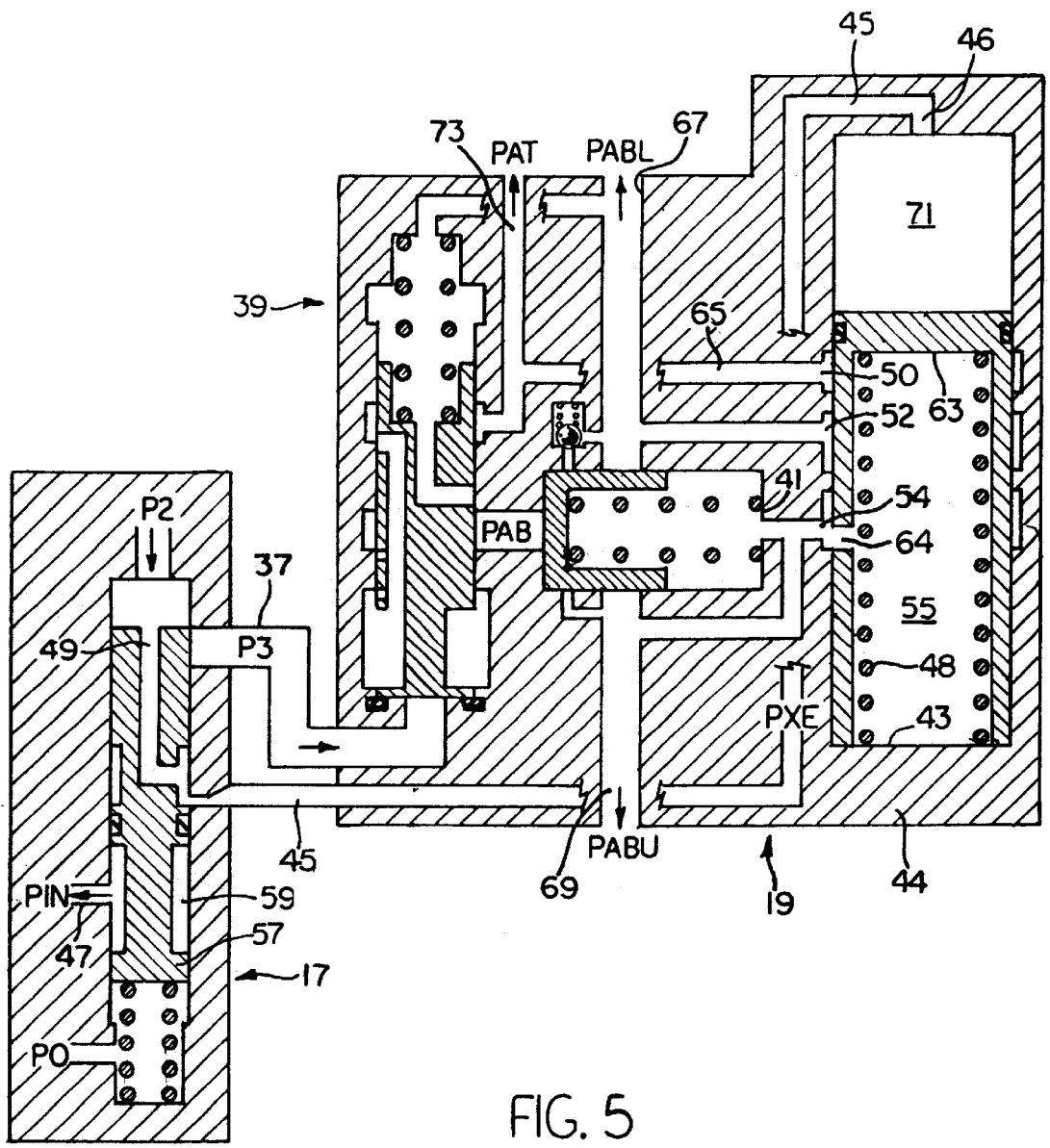
FIG. 5 is a cross-sectional view similar to FIGS. 2–4, and illustrating a third stage of fuel discharge from the ecology valve.

FIG. 5 shows the final position (last stage) of the ecology valve 43, where fuel has been returned to the upper air blast fuel manifold 33 (PABU pressure) through conduit 69. The pressurizing valve 17 and flow divider valves 39 and 41 remain in the same functional positions as described in FIGS. 3 and 4 up to the time that the ecology valve 43 reaches its hard stop, fully energized position with the chamber 71 (at pressure PXE) at its maximum volume. It should be noted that all three manifolds 31a, 31b and 33 have been refilled by the volume of fuel expelled from the ecology valve chamber 55.

Comparing FIGS. 2–5 it will be noted that the piston 63 has the single sidewall port 64 which sequentially communicates with housing 44 sidewall ports 50, 52 and 54. Thus, the ecology valve 43 has a first sidewall port 50 which is closed by the piston 63 when the piston is in its lowermost (FIG. 5) extreme position, a second sidewall port 52 which is closed by the piston 63 when the piston is in lowermost (FIG. 5) as well as its uppermost (FIG. 2) extreme positions, and a third sidewall port 54 which is closed by the piston 63 when the piston is in its uppermost extreme position. The second or middle sidewall port 52 opens during piston movement between its extreme positions to couple the variable volume chamber 55 with engine fuel lower manifolds 31. While there may be piston positions such as illustrated in FIG. 4 where the port 64 momentarily communicates with two sidewall ports, 52 and 54 for example, in substantially all piston positions, the piston closes at least two sidewall ports. All three ports are never open simultaneously.

Figure 6:
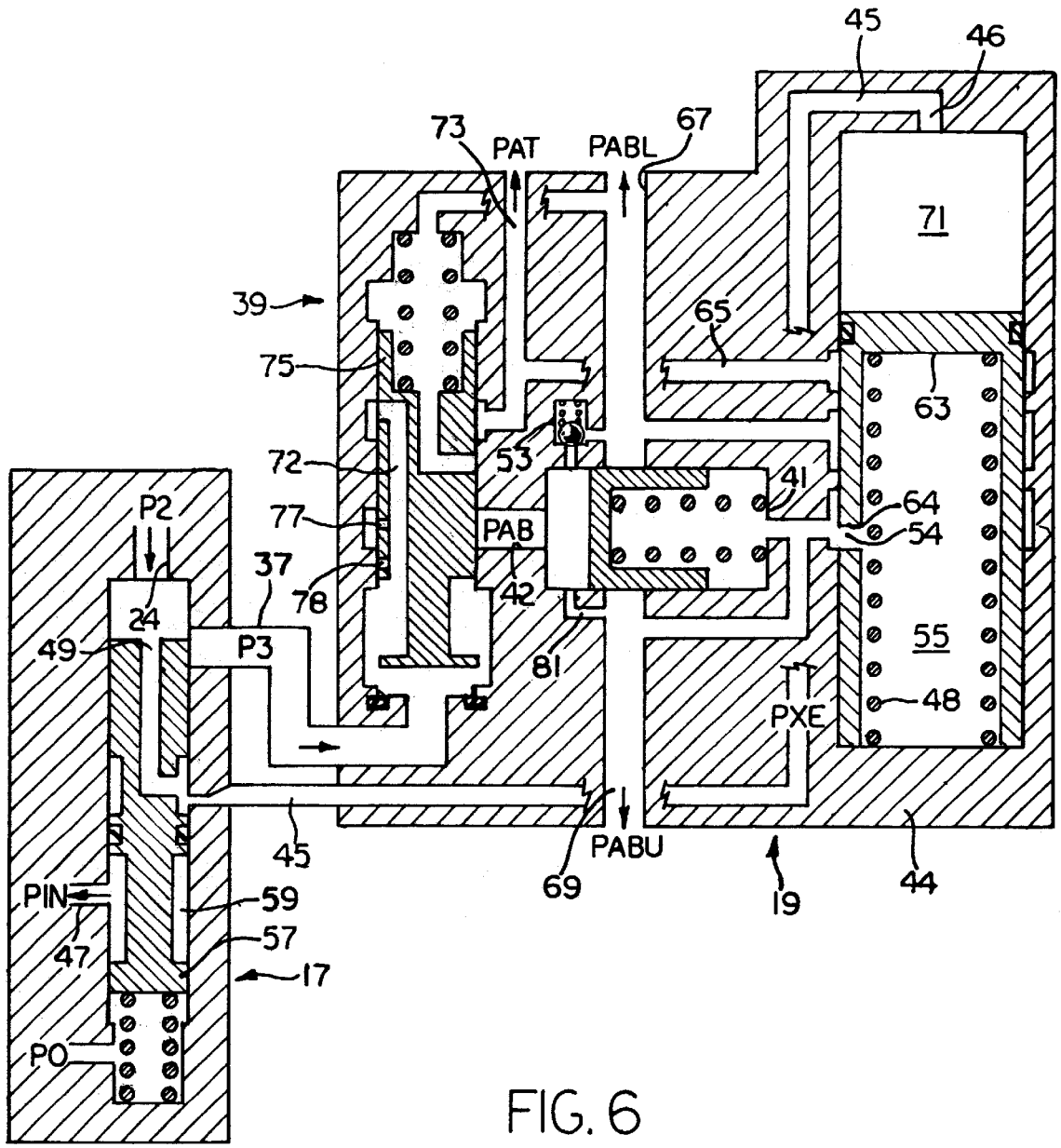
FIG. 6 is a cross-sectional view similar to FIGS. 2–5, and illustrating start-up conditions for the splitter valves.

FIG. 6 shows the pressurizing valve 17 opened, allowing metered fuel flow to pass to the flow divider and ecology module 19 (FDEM) through conduit 37. As flow enters the FDEM 19, the piston 75 of atomizer/air blast flow divider valve 39 translates off its soft seat 74, allowing fuel to flow to the atomizer manifold 31b at PAT pressure through line 73 and restricted flow to pass through port 83 and line 42 to the upper/lower air blast manifold flow divider valve 41 (PAB pressure) via sequential side wall orifices 77 and 78 in piston 75. The piston 79 of upper/lower air blast manifold flow divider valve 41 translates from its closed position, allowing flow to the upper manifold 33 through conduits 81 and 69 at PABU pressure. The translation of piston 79 also allows a biased flow of fuel to the lower manifold 31 (PABL pressure) through head effect valve 53 and line 67. The PABL pressure flow is biased by the head effect valve 53 which compensates for differences in elevation and line loss between the upper and lower manifolds. Without this compensation, the lower manifolds 31a and 31b would flow more fuel than the upper manifold 33, particularly at low metered burn flow rates. FIG. 6 illustrates the approximate positions of the valves during an engine start up.

Figure 7:
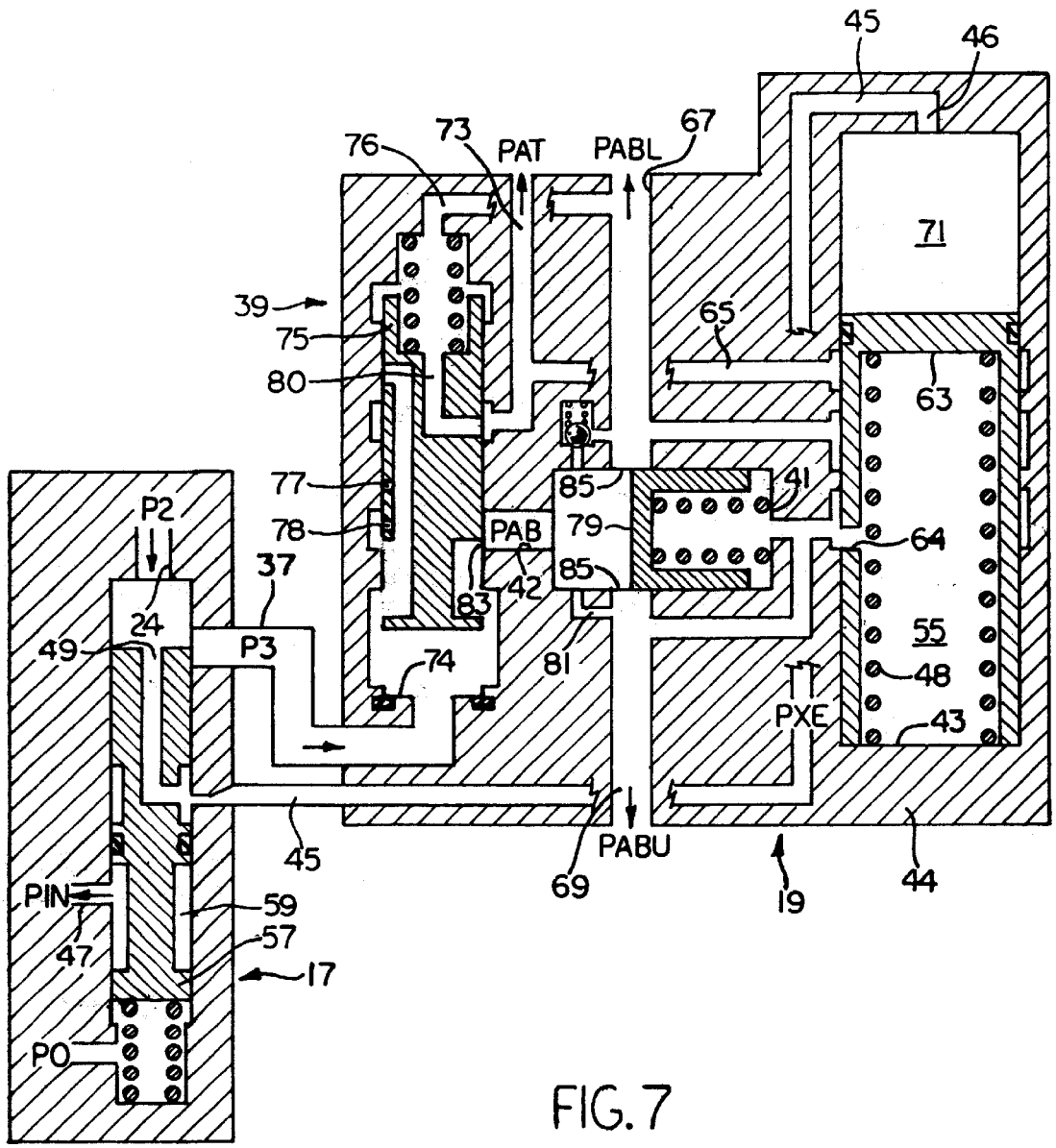
FIG. 7 is a cross-sectional view similar to FIGS. 2–6, and illustrating the flow divider and ecology module in the normal engine run configuration.

FIG. 7 shows the conditions defined in FIG. 6, but with a higher rate of burn flow. As flow increases, the pressurizing valve 17 further opens allowing additional metered fuel flow to the FDEM 19 through line 37. The piston 75 of atomizer/air blast flow divider valve 39 further translates from its closed position, opening port 83 that allows additional fuel flow to pass to the upper/lower air blast manifold flow divider valve 41 (PAB pressure) to increase the flow that was previously through side wall orifices 77 and 78 in piston 75.

The side wall orifices 77 and 78 are staged so that when orifice 77 is closing, the second orifice 78 opens, keeping the orifice area and flow from diminishing. At this position of valve 75, fuel routed to the combination atomizer and air blast nozzles (hybrid nozzles) of atomizer manifold 31b is supplied from the lower manifold pressure (PABL) via lines 76 and 73 and valve 39 opening 80, rather than from pressurizing valve 17 discharge pressure P3. The purpose for providing lower air blast manifold pressure (PABL) to the atomizer manifold 31b is to equate the total flow of a hybrid nozzle in manifold 31b to that of the flow of an air blast nozzle in the air blast manifold 31a (see FIG. 1). The piston 79 of upper/lower air blast manifold flow divider valve 41 further translates from its closed position, opening ports 85 that allow additional fuel flow to the upper (PABU pressure) manifold 33 and the lower (PABL pressure) manifolds 31, while maintaining equal flow to these manifolds.

Comparing FIGS. 6 and 7, the splitter valve 39 provides a low volume fuel flow path by way of side wall orifices 77 and 78 to the splitter valve 41 during engine start-up and a second high volume fuel flow path via port 83 (in parallel and in addition to the first) to the splitter valve 41 during normal engine running conditions. As also seen comparing FIGS. 6 and 7, the splitter valve 41 provides a pair of low volume fuel flow paths by way of passage 81 and head effect valve 53 to the upper manifold 33 and lower manifolds 31 respectively during engine start-up and a second pair of high volume fuel flow paths 69 and 67 to the upper manifold 33 and the lower manifolds 31 respectively during normal engine running conditions. The head effect fuel flow restricting valve 53 is in the low volume fuel flow path to the manifolds 31 to compensate for elevation difference, induced low burn rate fuel flow differences between the upper and lower manifolds. FIG. 7 illustrates the approximate positions of the valves for an engine run condition. It should be noted that during all engine operating conditions (FIGS. 6 and 7), the piston 63 of the ecology valve 43 is in its full energized position against that respective hard stop, making the ecology valve 19 a non-dynamic feature with respect to metered burn flow to the engine.

The process of cycling an engine from an engine-off condition, through start-up and substantially full throttle run, and subsequent shut-down and back to the engine-off condition should now be clear. When the pilot or other operator issues a command to start the engine, P2 pressure is supplied by way of line 45 to expand chamber 71 and discharging a quantity of fuel from the ecology reservoir 55 by way of port 50 into manifold 31b. Additional motion of piston 63 expels fuel into the other two manifolds 31a, 33 from reservoir 55. Additional fuel is supplied to manifold 31b and a limited quantity of additional fuel from fuel source 11 is supplied to the manifolds 31a and 33 to start the engine. The supply of fuel to all manifolds is increased to bring the engine to substantially full throttle operation. Later, the pilot or other operator issues a shut-down command interrupting fuel flow to all the manifolds to initiate engine shut-down. Lines 45 and 47 are reconnected by the pressurizing valve 17 and piston 63 moves upward under the urging of spring 48 sequentially extracting fuel from the manifolds and storing the extracted fuel in the ecology reservoir 55 to be burned during a subsequent engine start-up.

Figure 8:
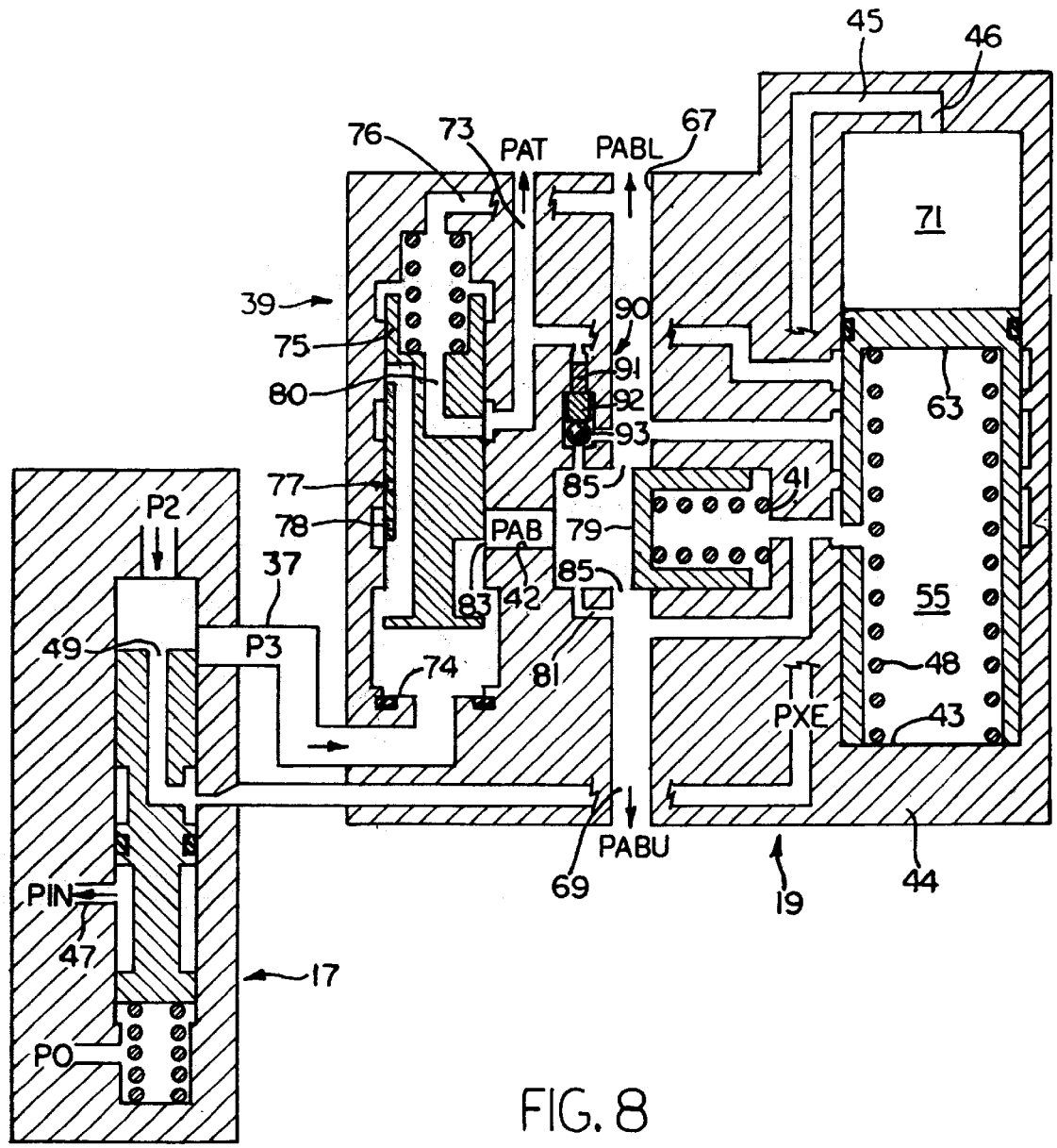
FIG. 8 is a cross-sectional view similar to FIGS. 2–7 but illustrating an alternative embodiment of the head effect valve of the flow divider and ecology module during normal engine run configuration.

FIG. 8 illustrates the aircraft fuel system of FIG. 7 but includes an alternative embodiment for the head effect valve 53 wherein weight or load member 92 and pressure loaded pin 91 are used to urge ball or valve member 93 against its seat. During normal engine run conditions, PAT and PABL pressures in lines 73 and 67 become equal as also shown in FIG. 7, with no pressure differential existing across the pin 91. In this condition, the ball 93 is urged against its seat solely by the force exerted by the combined weight of the pin 91 and weight 92, compensating only for head effect and line losses. During engine start-up conditions as illustrated in FIG. 6, PAT pressure in line 73a and its associated orifice (see FIG. 8) and which is exerted on the end of the pin 91 is greater than PABL pressure on the other end of the pin, which creates additional force to urge the ball valve 93 against its seat. This further throttles or lessens fuel flow being delivered to the lower manifold air blast nozzles via line 67, which compensates for the greater flow being delivered to the lower manifold atomizer nozzles via line 73 during engine start-up. This results in equal flow to the upper and lower halves of the engine for all conditions, including engine start-up. It should be noted that the weight 92 shown in the head effect valve 90 of FIG. 8 could be replaced with a spring as shown in FIGS. 2–7, and the spring or weight shown in FIGS. 2–8 could be replaced by any other equivalent device or structure that provides an appropriate load upon the ball valve.

What is claimed is:

1. The process of operating an engine of the type having a plurality of fuel manifolds from an engine-off condition, through start-up and engine run, shut-down and back to the engine-off condition, comprising:

discharging a quantity of fuel from an ecology reservoir into at least one manifold;

supplying a quantity of additional fuel from a fuel source to at least one manifold to initiate engine start-up;

increasing the supply of fuel to all manifolds to bring the engine to engine run operation;

interrupting fuel flow to all the manifolds to initiate engine shut-down; and sequentially extracting fuel from the manifolds and storing the extracted fuel in the ecology reservoir to be burned during a subsequent engine start-up.

2. The process of claim 1, wherein there are three manifolds and three disjoint time intervals, one for each manifold, during which fuel is extracted from a respective manifold.

3. A fuel control system for supplying metered quantities of fuel from a fuel supply, through a fuel pump, a metering valve and a pressurizing valve to a plurality of engine fuel manifolds including an atomizer nozzle manifold, an upper air blast nozzle manifold and a lower air blast nozzle manifold, an improved process of dividing fuel flow intermediate the pressurizing valve and the engine fuel manifolds for appropriately distributing fuel flow among the plurality of engine fuel manifolds, comprising the steps of:

providing a concatenated pair of two-way splitter valves to effect by means of a first splitter valve distribution of the fuel flow between the atomizer nozzle manifold and the remaining air blast manifolds, and by means of a second splitter valve distribution of down stream fuel flow from the first splitter valve between the upper and lower nozzle manifolds.

4. The process of claim 3, comprising the steps of providing a pair of low volume fuel flow paths to the upper and lower manifolds during engine start-up and a second pair of high volume fuel flow paths to the upper and lower manifolds during normal engine running conditions.

5. The process of claim 4, further comprising the step of providing a head effect valve in the low volume fuel flow path to the lower manifolds to compensate for low burn rate fuel flow differences between the upper and lower air blast nozzle manifolds.

6. The process of claim 5, comprising the step of reducing fuel flow to the air blast nozzles of the lower air blast nozzle manifold in order to compensate for greater fuel flow to the atomizer nozzle manifold during engine start-up conditions.

7. The process of claim 6, wherein the combined fuel flow of the atomizer nozzle manifold and lower air blast nozzle manifold substantially equals that of the upper air blast nozzle manifold.

8. The process of claim 7, comprising the step of communicating the head effect valve with both fuel pressure being supplied to the atomizer nozzle manifold and fuel pressure being supplied to the lower air blast nozzle manifold.

9. The process of claim 8, wherein the head effect valve includes a valve member, a load member, and a pin.

10. The process of claim 3, comprising the step of the first splitter valve providing a low volume fuel flow path to the second splitter valve during engine start-up and a second high volume fuel flow path to the second splitter valve during engine running conditions.

11. The process of claim 10, comprising the step of the first splitter valve providing a different rate of fuel flow to the atomizer nozzle manifold during engine running conditions so that the different rate of fuel flow to nozzles of the atomizer nozzle manifold is substantially equal to the rate of fuel flow to an air blast nozzle in the lower air blast nozzle manifold.

12. A fuel control system for supplying metered quantities of fuel to a plurality of engine fuel manifolds which include an atomizer nozzle manifold, a lower air blast nozzle manifold and an upper air blast nozzle manifold, an improved process for supplying fuel comprising the steps of:

providing a fuel flow restricting valve which comprises a valve member, means for exerting a load upon the valve member, and a pin member;

communicating the fuel flow restricting valve with both fuel pressure being supplied to the atomizer nozzle manifold and fuel pressure being supplied to the lower air blast nozzle manifold;

reducing fuel flow to the air blast nozzles of the lower air blast nozzle manifold in order to compensate for greater fuel flow to the atomizer nozzle manifold during engine start-up conditions, and substantially equalizing the combined fuel flow of the atomizer nozzle manifold and lower air blast nozzle manifold with that of the upper air blast nozzle manifold during both engine start-up and running conditions.

13. The process in accordance with claim 12, further comprising the steps of providing a first splitter valve to distribute fuel flow between the atomizer nozzle manifold and the remaining manifolds, and a second splitter valve down stream from the first splitter valve and for distributing fuel flow between the upper and lower air blast nozzle manifolds.

14. The improvement of claim 13, further comprising the steps of providing a pair of low volume fuel flow paths to the upper and lower air blast nozzle manifolds during engine start-up and a second pair of high volume fuel flow paths to the upper and lower air blast nozzle manifolds during engine running conditions.

* * * * *